Patented Dec. 1, 1931                                                                                            1,834,040

UNITED STATES PATENT OFFICE

ALFONS ASCHERL AND WOLFGANG GRUBER, OF BURGHAUSEN, GERMANY, ASSIGNORS TO DR. ALEXANDER WACKER GESELLSCHAFT FUR ELEKTROCHEMISCHE INDUSTRIE, OF MUNICH, GERMANY, A CORPORATION OF GERMANY

PROCESS FOR REDUCING THE VISCOSITY CHARACTERISTICS OF CELLULOSE ETHERS

No Drawing. Application filed December 5, 1929, Serial No. 411,982, and in Great Britain November 8, 1929.

This invention relates to a process whereby the viscosity characteristics of cellulose ethers may be reduced.

An object of this invention is to provide a process in which the viscosity characteristics of cellulose ethers may be reduced without adversely affecting other properties of the ethers so that lacquers, threads, films, etc., made from cellulose ethers treated by this process will be as elastic and strong as threads, lacquers, films, etc. made from untreated cellulose ethers.

Heretofore processes have been known by which the viscosity characteristics of cellulose ethers could be reduced but these processes produced a breaking down or disintegrating effect on the ethers as is shown by the changed solubility of the treated ethers. Products from such ethers show inferior properties of elasticity and strength greatly offsetting the advantages of the reduced viscosity characteristics.

The process of the present invention comprises heating the cellulose ethers to be treated, with strong acetic acid in the absence of hydrolyzing or decomposing agents, until the viscosity characteristics of the ethers are lowered.

The viscosity characteristics of the cellulose ethers are materially lowered by this process so that the ethers may be used for lacquers, artificial silks, films, etc., but no perceptible change in the other physical properties of the ethers is affected. The fact that the solubility of the ethers remains substantially unchanged indicates that there is no disintegration of the ethers.

This process applies to cellulose ethers generally and particularly to ethyl cellulose and benzyl cellulose.

To specifically illustrate the invention the following example is given:—

One part by weight of a cellulose ether having high viscosity characteristics is dissolved in 5 to 20 parts by weight of 80 to 100% acetic acid and is heated from ½ to 4 hours at 60° C. to 100° C. Then the solution, either hot or cold, is precipitated by water, washed and dried. Where the concentration of the acid is of the order stated, part, at least, of the ether is dissolved, and must be precipitated by additional water after the heating.

The heating can be carried out either at atmospheric pressure or in an autoclave.

The resulting product in the example given above is a cellulose ether of materially reduced viscosity characteristics which is readily soluble in the ordinary solvents for untreated cellulose ether and gives highly concentrated solutions of low viscosity when dissolved. Threads, lacquers, films, sheets and the like made from such solutions are as strong, flexible, and elastic as similar products made from untreated ethers.

The invention claimed is:

1. Process for reducing the viscosity characteristics of cellulose ether comprising heating said ether with a solution of concentrated acetic acid until its viscosity characteristics are lowered.

2. Process for reducing the viscosity characteristics of cellulose ether comprising heating said ether with a solution of concentrated acetic acid in the absence of hydrolyzing agents for the ether until its viscosity characteristics are reduced.

3. Process for reducing the viscosity characteristics of cellulose ether comprising heating said ether at 60° to 100° C. with a solution of concentrated acetic acid in the absence of hydrolyzing agents for the ether until its viscosity characteristics are reduced.

4. Process for reducing the viscosity characteristics of cellulose ether comprising heating said ether at 60° to 100° C. with an 80% to 100% acetic acid solution in the absence of hydrolyzing or decomposing agents for the ether until its viscosity characteristics are reduced.

5. Process for reducing the viscosity characteristics of cellulose ether comprising heating said ether at 60–100° C. with an 80–100% acetic acid solution between 15 minutes and 4 hours in the absence of hydrolyzing or decomposing agents for the ether.

6. Process for reducing the viscosity characteristics of cellulose ether comprising heating one part by weight of cellulose ether at 60–100° C. with 5–20 parts by weight of 80–100% acetic acid solution between 15 minutes and 4 hours in the absence of hydrolyzing or decomposing agents, precipitating with water, washing and drying.

Signed at Munich, State of Bavaria, Germany, this 21st day of November A. D. 1929.

Dr. ALFONS ASCHERL.
Dr. WOLFGANG GRUBER.